US012806612B2

(12) United States Patent
Yabuta et al.

(10) Patent No.: US 12,806,612 B2
(45) Date of Patent: Nov. 24, 2026

(54) GREENHOUSE AND GLASS SHEET WITH COATING FILM

(71) Applicant: Nippon Sheet Glass Company, Limited, Tokyo (JP)

(72) Inventors: Takeshi Yabuta, Hyogo (JP); Masafumi Taguchi, Chiba (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 119 days.

(21) Appl. No.: 17/905,892

(22) PCT Filed: Mar. 9, 2021

(86) PCT No.: PCT/JP2021/009380

§ 371 (c)(1),
(2) Date: Sep. 8, 2022

(87) PCT Pub. No.: WO2021/182485

PCT Pub. Date: Sep. 16, 2021

(65) Prior Publication Data

US 2023/0149913 A1 May 18, 2023

(30) Foreign Application Priority Data

Mar. 11, 2020 (JP) ................................ 2020-042229

(51) Int. Cl.
*B01J 35/39* (2024.01)
*A01G 9/14* (2006.01)
(Continued)

(52) U.S. Cl.
CPC ................ *B01J 35/39* (2024.01); *A01G 9/14* (2013.01); *B01J 21/063* (2013.01); *B01J 21/066* (2013.01);
(Continued)

(58) Field of Classification Search
CPC ................ A01G 9/1438; A01G 9/1469; A01G 2009/1484; A01G 9/20; A01G 9/14;
(Continued)

(56) References Cited

U.S. PATENT DOCUMENTS 3,635,751 A * 1/1972 Long, III ................ C03C 17/22 428/428
4,560,581 A * 12/1985 Deal ......................... H01J 9/20 427/64
(Continued)

FOREIGN PATENT DOCUMENTS

CN 109791221 A * 5/2019 .......... B01J 37/0215
JP 86081762 U 6/1985
(Continued)

OTHER PUBLICATIONS

Extended European Search Report issued for European Patent Application No. 21768173.3, dated Feb. 19, 2024, 9 pages.
(Continued)

*Primary Examiner* — Kimberly S Berona
*Assistant Examiner* — Kevin M Dennis
(74) *Attorney, Agent, or Firm* — HSML P.C.

(57) ABSTRACT

A greenhouse according to the present invention includes: a ceiling portion; and in at least a portion of the ceiling portion, a glass sheet with a coating film. The glass sheet with a coating film has a total light transmittance of 90% to 98%, a haze ratio of 20% to 80%, and a hemispherical transmittance of 80% to 90%. When a test is performed according to JIS R 1703-1: 2007 by applying oleic acid to a surface of a coating film and subsequently irradiating the surface with ultraviolet light at an intensity of 1.0 mW/cm$^2$, a time period from start of irradiation with the ultraviolet light to a point at which a water contact angle on the surface reaches 5° is 24 hours or less.

19 Claims, 3 Drawing Sheets

(51) Int. Cl.

| | |
|---|---|
| ***B01J 21/06*** | (2006.01) |
| ***B01J 21/08*** | (2006.01) |
| ***B01J 35/45*** | (2024.01) |
| ***C03C 17/00*** | (2006.01) |
| ***C03C 17/25*** | (2006.01) |

(52) U.S. Cl.
CPC ............... *B01J 21/08* (2013.01); *B01J 35/45* (2024.01); *C03C 17/002* (2013.01); *C03C 17/007* (2013.01); *C03C 17/256* (2013.01); *B01J 2235/00* (2024.01); *B01J 2235/30* (2024.01); *C03C 2217/45* (2013.01); *C03C 2217/477* (2013.01); *C03C 2217/478* (2013.01); *C03C 2217/48* (2013.01); *C03C 2217/71* (2013.01); *C03C 2218/112* (2013.01); *C03C 2218/113* (2013.01); *C03C 2218/32* (2013.01)

(58) Field of Classification Search
CPC .. F24S 80/00; B01J 35/39; B01J 35/23; B01J 35/50; B01J 21/063; B01J 21/066; B01J 21/08; C03C 17/002; C03C 17/007; C03C 17/256
USPC ............................................................... 47/17
See application file for complete search history.

(56) References Cited

U.S. PATENT DOCUMENTS

| | | | | |
|---|---|---|---|---|
| 4,596,745 | A * | 6/1986 | Chao | H01J 29/896 428/428 |
| 4,694,218 | A * | 9/1987 | Chao | C03C 17/25 427/160 |
| 4,965,096 | A * | 10/1990 | Deal | C03C 17/25 428/428 |
| 6,013,372 | A * | 1/2000 | Hayakawa | C03C 17/36 428/688 |
| 6,830,785 | B1 * | 12/2004 | Hayakawa | C03C 17/23 134/1 |
| 7,294,365 | B2 * | 11/2007 | Hayakawa | C03C 17/23 134/1 |
| 7,998,562 | B2 * | 8/2011 | Abe | D06N 3/047 428/421 |
| 9,242,893 | B2 * | 1/2016 | Oudard | H01L 31/02168 |
| 9,382,449 | B2 * | 7/2016 | Maghsoodi | G02B 1/111 |
| 9,441,119 | B2 * | 9/2016 | Kalyankar | C09D 7/67 |
| 9,707,592 | B2 * | 7/2017 | Lu | C09D 183/06 |
| 10,329,430 | B2 * | 6/2019 | Koyo | C08K 3/36 |
| 10,698,136 | B2 * | 6/2020 | Uchiyama | G02B 1/111 |
| 11,448,872 | B2 * | 9/2022 | Carpenter | G02B 27/0006 |
| 2002/0014090 | A1 | 2/2002 | Tsujino et al. | |
| 2002/0016250 | A1 * | 2/2002 | Hayakawa | G02B 1/18 502/340 |
| 2004/0028918 | A1 * | 2/2004 | Becker | C03C 17/25 65/60.5 |
| 2005/0019700 | A1 * | 1/2005 | Hayakawa | G02B 1/18 430/311 |
| 2005/0233135 | A1 * | 10/2005 | Lyer | C08J 7/0423 428/447 |
| 2010/0209673 | A1 * | 8/2010 | Viasnoff | C03C 15/00 216/37 |
| 2012/0148832 | A1 | 6/2012 | Yabuta et al. | |
| 2013/0095237 | A1 * | 4/2013 | Kalyankar | C09D 5/006 977/773 |
| 2013/0163087 | A1 * | 6/2013 | Lecolley | G02B 1/113 65/17.2 |
| 2015/0004398 | A1 * | 1/2015 | Yabuta | C03C 17/256 428/328 |
| 2015/0375475 | A1 * | 12/2015 | Cook | C03C 3/11 65/60.5 |
| 2016/0041307 | A1 * | 2/2016 | Lu | C23C 18/122 523/435 |
| 2016/0282522 | A1 * | 9/2016 | Schiavoni | B32B 17/10761 |
| 2018/0141845 | A1 | 5/2018 | Schiavoni et al. | |
| 2019/0162877 | A1 | 5/2019 | Koyo et al. | |
| 2020/0131082 | A1 * | 4/2020 | Lequippe | C03C 17/007 |

FOREIGN PATENT DOCUMENTS

| | | | | | |
|---|---|---|---|---|---|
| JP | H04141026 | A | | 5/1992 | |
| JP | 2001278637 | A | * | 10/2001 | C03C 1/008 |
| JP | 2015129081 | A | | 7/2015 | |
| JP | 2016140989 | A | | 8/2016 | |
| JP | 2018517649 | A | | 7/2018 | |
| WO | WO-2019008282 | A2 | * | 1/2019 | A01G 9/14 |

OTHER PUBLICATIONS

International Search Report and Written Opinion issued for International Patent Application No. PCT/JP2021/009380, Date of mailing: May 25, 2021, 9 pages including English translation of Search Report.

* cited by examiner

GREENHOUSE AND GLASS SHEET WITH COATING FILM

TECHNICAL FIELD

The present invention relates to a greenhouse and a glass sheet with a coating film. The present invention relates more particularly to a glass sheet on which a coating film having a high diffuse transmission function and a high photocatalytic function is formed, and to a greenhouse including the glass sheet on which the coating film is formed.

BACKGROUND ART

In the field of greenhouse cultivation, a technique of efficiently introducing sunlight into a greenhouse has been studied. For example, Patent Literature 1 discloses a greenhouse including, below a translucent roof, a reflecting plate for irradiating plants with sunlight. However, this greenhouse has a problem that complicated control is required because it is necessary to adjust the angle of the reflecting plate according to the movement of the sun.

Studies have been conducted also on greenhouses in which a decrease in transmitted light due to dirt on the roof is prevented. For example, Patent Literature 2 discloses a greenhouse with a self-propelled cleaning device disposed on its roof. However, this greenhouse has a problem that the manufacturing cost increases because it is necessary to dispose the cleaning device and to reinforce the structure of the greenhouse.

Patent Literature 3 discloses a technique of using, to guide sunlight throughout a greenhouse while avoiding formation of hot spots on plants, a glass sheet including a predetermined texture as a roof of the greenhouse. This technique controls the texture to have a predetermined shape to improve the hemispherical transmittance. Specifically, the texture is directly applied to the surface of the glass sheet by rolling, or is applied by embossing a layer formed on the glass sheet by a sol-gel method.

However, the texture in Patent Literature 3, which is applied by an imprinting process such as rolling or embossing, is typically a repetition of pyramidal patterns with a large number of recesses narrowing toward bottoms. Thus, dirt easily adheres to the surface of the glass sheet and is not easily removed. The dirt adhesion is a factor inhibiting the stable introduction of sunlight over a long time period.

CITATION LIST

Patent Literature

Patent Literature 1: Microfilm of JP S58-175008 U (JP S60-081762 U)
Patent Literature 2: JP H04-141026 A
Patent Literature 3: JP 2018-517649 A

SUMMARY OF INVENTION

Technical Problem

An object of the present invention is to provide a novel greenhouse suitable for guiding sunlight into the greenhouse efficiently and stably over a long time period. Another object of the present invention is to provide a light guide portion of such a greenhouse, specifically, a glass sheet suitable for use as a roofing material.

Solution to Problem

The present invention provides a greenhouse including:

a ceiling portion; and in at least a portion of the ceiling portion, a glass sheet with a coating film, the glass sheet with a coating film including a glass sheet and a coating film, wherein the glass sheet with a coating film has a total light transmittance of 90% to 98%, a haze ratio of 20% to 80%, and a hemispherical transmittance of 80% to 90%, and when a test is performed according to Japanese Industrial Standards (JIS) R 1703-1: 2007 by applying oleic acid to a surface of the coating film and subsequently irradiating the surface with ultraviolet light at an intensity of 1.0 mW/cm$^2$, a time period from start of irradiation with the ultraviolet light to a point at which a water contact angle on the surface reaches 5° is 24 hours or less.

The present invention also provides a glass sheet with a coating film including:

a glass sheet; and a coating film, wherein the glass sheet with a coating film has a total light transmittance of 90% to 98%, a haze ratio of 20% to 80%, and a hemispherical transmittance of 80% to 90%, and when a test is performed according to Japanese Industrial Standards (JIS) R 1703-1: 2007 by applying oleic acid to a surface of the coating film and subsequently irradiating the surface with ultraviolet light at an intensity of 1.0 mW/cm$^2$, a time period from start of irradiation with the ultraviolet light to a point at which a water contact angle on the surface reaches 5° is 24 hours or less.

The greenhouse and the glass sheet according to the present invention may include, as the coating film, a low-emissivity film as well as the above-described light diffusing film having a light diffusion function. In this case, including the low-emissivity film leads to a slight decrease in total light transmittance and hemispherical transmittance. That is, another aspect of the present invention provides a greenhouse and a glass sheet described below.

Another aspect of the present invention provides a greenhouse including:

a ceiling portion; and in at least a portion of the ceiling portion, a glass sheet with a coating film, the glass sheet with a coating film including a glass sheet and a coating film, wherein the glass sheet with a coating film includes, as the coating film, a light diffusing film and a low-emissivity film, the glass sheet with a coating film has a total light transmittance of 70% to 93%, a haze ratio of 20% to 80%, and a hemispherical transmittance of 65% to 88%, and when a test is performed according to Japanese Industrial Standards (JIS) R 1703-1: 2007 by applying oleic acid to a surface of the light diffusing film and subsequently irradiating the surface with ultraviolet light at an intensity of 1.0 mW/cm$^2$, a time period from start of irradiation with the ultraviolet light to a point at which a water contact angle on the surface reaches 5° is 24 hours or less.

The present invention also provides a glass sheet with a coating film including:

a glass sheet; and a coating film, wherein the glass sheet with a coating film includes, as the coating film, a light diffusing film and a low-emissivity film, the glass sheet with a coating film has a total light transmittance of 70% to 93%, a haze ratio of 20% to 80%, and a hemispherical transmittance of 65% to 88%, and when a test is performed according to Japanese Industrial Standards (JIS) R 1703-1: 2007 by applying oleic acid to a surface of the light diffusing film and subsequently irradiating the surface with ultraviolet light at an intensity of 1.0 $mW/cm^2$, a time period from start of irradiation with the ultraviolet light to a point at which a water contact angle on the surface reaches 5° is 24 hours or less.

Advantageous Effects of Invention

According to the present invention, it is possible to provide a greenhouse suitable for guiding sunlight into the greenhouse efficiently and stably over a long time period and a glass sheet suitable for use as a roofing material for such a greenhouse.

DESCRIPTION OF EMBODIMENTS

Hereinafter, embodiments of the present invention will be described with reference to the drawings. The following description is an example of the present invention, and the present invention is not limited to the following embodiments.

Embodiment 1

Figure 1:
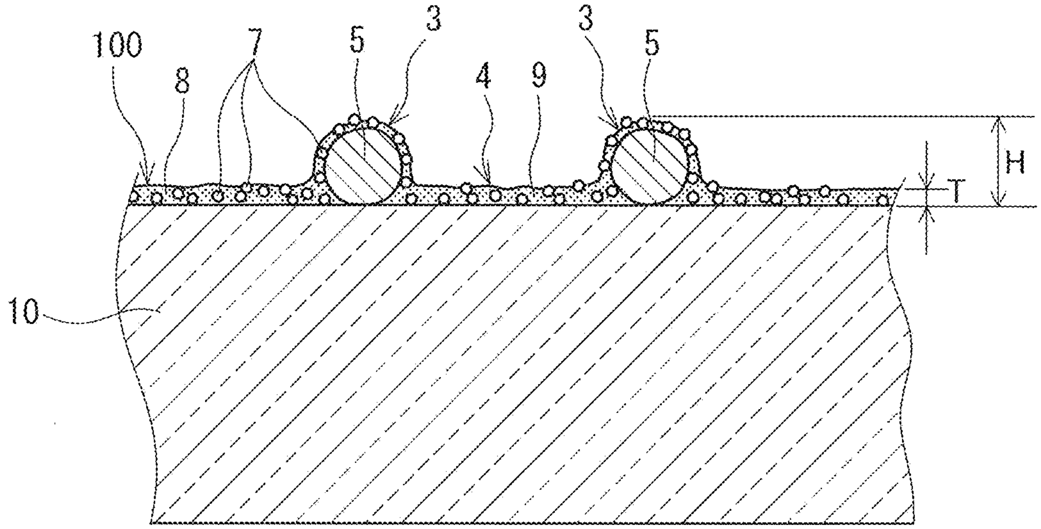
FIG. 1 is a cross-sectional view schematically showing an example of a glass sheet on which a coating according to Embodiment 1 is formed.

As shown in FIG. 1, a glass sheet with a coating film according to the present embodiment includes a glass sheet 10 and a coating film 100 formed on a principal surface of the glass sheet 10. In the present description, the term "principal surface" means a surface having the largest area of the glass sheet.

The coating film 100 includes fine silicon oxide particles 5 and fine titanium oxide particles 7. The coating film 100 includes a binder 8 as well. The binder 8 is present at least on the surfaces of the particles and at contact portions between the particles and contact portions between the particles and a substrate, and serves to increase binding between the particles or between the particles and the substrate at the contact portions. The coating film 100 may be formed on one principal surface of the glass sheet 10. The coating film 100 may be formed on only a portion of one principal surface of the glass sheet 10. One principal surface of the glass sheet 10 may be substantially covered with the coating film 100.

The fine silicon oxide particles 5 are, for example, spherical particles. At least a portion, preferably at least 50%, of the fine silicon oxide particles 5 may be present in the state of primary particles in the height direction of the coating, in other words, may be present without being stacked on other fine silicon oxide particles 5. The average particle diameter of the fine silicon oxide particles 5 may be 0.05 μm to 50 μm, 0.05 μm to 20 μm, 0.05 μm to 10 μm, or 0.1 μm to 5 μm. Since silicon oxide has a relatively low refractive index, the coating film 100 has a reduced apparent refractive index due to the fine silicon oxide particles 5. Furthermore, spherical particles including silicon oxide and having an equal particle diameter are produced on a commercial scale at a low cost, and are easily available from the viewpoint of quantity, quality, and cost. By appropriately adjusting the average particle diameter of the fine silicon oxide particles 5, the haze ratio of the coating film 100 can be improved. That is, by using the fine silicon oxide particles 5 having an appropriate average particle diameter for the coating film 100, incident light can be transmitted while being diffused favorably.

The "average particle diameter" in the present description may be, with respect to a fine silicon oxide particle dispersion or a fine titanium oxide particle dispersion for use in preparation of the coating film 100, the particle diameter (d50) at a cumulative volume of 50%, determined from a volumetric particle size distribution by a laser diffraction scattering method. The fine silicon oxide particles 5 and the fine titanium oxide particles 7 can be distinguished from each other by performing a composition analysis by an energy dispersive X-ray spectroscopy (EDX).

The content of the fine silicon oxide particles 5 in the coating film 100 may be 10 mass % to 90 mass %, 22 mass % to 85 mass %, 22 mass % to 77.5 mass %, 25 mass % to 74.5 mass %, 30 mass % to 69.5 mass %, or even 35 mass % to 64.5 mass %.

The fine silicon oxide particles 5 included in the coating film 100 may be solid and substantially spherical. The phrase "substantially spherical" means that the ratio of the largest diameter to the smallest diameter (largest diameter/smallest diameter) of a fine particle as observed with a scanning electron microscope (SEM) is 1.0 to 1.5.

The average particle diameter of the fine titanium oxide particles 7 may be 0.005 μm to 0.1 μm, 0.01 μm to 0.05 μm, or 0.01 μm to 0.03 μm. By appropriately adjusting the average particle diameter of the fine titanium oxide particles 7, the surface area of titanium oxide per unit mass can be increased. Accordingly, the photocatalytic function of the coating film 100 can be improved. Furthermore, by appropriately adjusting the average particle diameter of the fine titanium oxide particles 7, a coating liquid in which the fine titanium oxide particles 7 are uniformly dispersed can be obtained.

The content of the fine titanium oxide particles 7 in the coating film 100 may be 0.1 mass % to 20 mass %, 0.5 mass % to 20 mass %, 1 mass % to 20 mass %, or even 4 mass % to 18 mass %. The content of the fine titanium oxide particles 7 in the coating film 100 is preferably 0.5 mass % to 5 mass %. To enhance the photocatalytic function, the content of the fine titanium oxide particles 7 may be 7 mass % or more. In particular, in the case where a figured glass sheet is used as the glass sheet 10, the content of the fine titanium oxide particles 7 may be 10 mass % or more or even 15 mass % or more.

The fine titanium oxide particles 7 included in the coating film 100 are solid and substantially spherical. By including the fine titanium oxide particles 7 in the coating film 100, the photocatalytic function can be imparted to the coating film 100. Owing to inclusion of the fine titanium oxide particles 7, irradiation to the coating film 100 with light having a predetermined wavelength (e.g., 400 nm or less) causes decomposition of an organic substance adhered to the coating film 100 and causes hydrophilization of the coating film 100.

By appropriately adjusting the ratio of the average particle diameter of the fine titanium oxide particles 7 to the average particle diameter of the fine silicon oxide particles 5, it is possible to impart the photocatalytic function while suppressing a decrease in visible light transmittance. The ratio of the average particle diameter of the fine titanium oxide particles 7 to the average particle diameter of the fine silicon oxide particles 5 may be, for example, 0.001 to 0.3, 0.002 to 0.2, or 0.002 to 0.1.

In the coating film 100, the ratio of the mass of the fine titanium oxide particles 7 to the mass of the fine silicon oxide particles 5 is not particularly limited, and is, for example, 0.01 to 0.30. Accordingly, the coating film 100 can reliably have a high diffuse transmission function and can also reliably have a high photocatalytic function. The ratio of the mass of the fine titanium oxide particles 7 to the mass of the fine silicon oxide particles 5 may be 0.02 to 0.25, 0.03 to 0.24, or 0.05 to 0.23.

The coating film 100 may include the binder 8. The binder 8 preferably includes at least one selected from the group consisting of silicon oxide, zirconium oxide, and aluminum oxide, and more preferably includes silicon oxide and/or zirconium oxide. The binder 8 may include silicon oxide ($SiO_2$) and zirconium oxide ($ZrO_2$). The binder 8 may include silicon oxide and not include zirconium oxide and aluminum oxide.

As a source of silicon oxide for the binder 8, a hydrolyzable silicon compound such as a silicon alkoxide can be used. The silicon alkoxide is preferably tetramethoxysilane, tetraethoxysilane, or tetraisopropoxysilane. Examples of the silicon alkoxide include trifunctional and difunctional silicon alkoxides such as methyltrimethoxysilane, methyltriethoxysilane, dimethyldiethoxysilane, diethyldiethoxysilane, phenyltriethoxysilane, glycidoxyalkyltrialkoxysilane, other epoxysilanes, acrylicsilanes, methacrylsilanes, and aminosilanes. Examples of the glycidoxyalkyltrialkoxysilane include 3-glycidoxypropyltrimethoxysilane. These hydrolyzable silicon compounds are subjected to hydrolysis and polycondensation by a sol-gel method to form silicon oxide included in the binder 8. Note, however, that the silicon alkoxide is not particularly limited as long as it is a compound from which silicon oxide can be formed by a sol-gel method.

As a source of zirconium oxide for the binder 8, a zirconium compound can be used. The zirconium compound may be a zirconium alkoxide. The zirconium compound is preferably a water-soluble inorganic zirconium compound added to a coating liquid for forming the coating film 100. Alternatively, the zirconium compound is preferably zirconium halide or zirconium nitrate. In this case, preferred zirconium halide is zirconium chloride. By including zirconium oxide, the coating film 100 can have a higher chemical durability and preferably an appropriate refractive index. Furthermore, by including zirconium oxide in the binder 8, the coating film 100 can also have an improved durability against alkali.

The content of zirconium oxide in the binder 8 may be 5 mass % to 50 mass %, 6 mass % to 40 mass %, or 7 mass % to 30 mass % with respect to the total amount of the binder 8. On the other hand, in another preferred embodiment, the content of zirconium oxide is preferably 3 mass % to 8 mass %, suitably 5 mass % to 7 mass %.

The content of the binder 8 in the coating film 100 may be 5 mass % to 90 mass %, 5 mass % to 79.5 mass %, 5 mass % to 77.5 mass %, 22 mass % to 77.5 mass %, 25 mass % to 74.5 mass %, 30 mass % to 69.5 mass %, or even 35 mass % to 64.5 mass %.

In the coating film 100, the content of silicon oxide in the binder 8 may be 100 mass %, 5 mass % to 97 mass %, 10 mass % to 97 mass %, 15 mass % to 95 mass %, or even 20 mass % to 93 mass %.

In the coating film 100, the sum of the contents of $SiO_2$ in the fine silicon oxide particles 5 and $SiO_2$ in the binder 8, the content of $TiO_2$ in the fine titanium oxide particles 7, and the content of $ZrO_2$ are not particularly limited. In the coating film 100, the sum of the contents of $SiO_2$ in the fine silicon oxide particles 5 and $SiO_2$ in the binder 8 may be 70 mass % to 99 mass %, 79 mass % to 98 mass %, 79 mass % to 96.5 mass %, 80 mass % to 95 mass %, 85 mass % to 95 mass %, or 85 mass % to 93 mass %. The content of $TiO_2$ in the coating film 100 may be 0.1 mass % to 20 mass %, 0.5 mass % to 20 mass %, 1 mass % to 20 mass %, or 2.5 mass % to 20 mass %. The content of $ZrO_2$ in the coating film 100 may be 5 mass % to 45 mass %, 10 mass % to 40 mass %, or 20 mass % to 30 mass %. The content of $ZrO_2$ in the coating film 100 is preferably 0 mass % to 10 mass %, more preferably 1 mass % to 7 mass %, still more preferably 2 mass % to 7 mass %. By appropriately adjusting the content of each component in the coating film 100, the glass sheet with a coating film can have a more excellent diffuse transmission function. Furthermore, the glass sheet with a coating film can have an excellent photocatalytic function as well.

By appropriately adjusting the content of the fine silicon oxide particles 5 in the coating film 100, the diffuse transmittance can be further improved. By appropriately adjusting the content of the fine titanium oxide particles 7 in the coating film 100, the coating film 100 can have a higher photocatalytic function. By appropriately adjusting the content of the binder 8 in the coating film 100, the coating film 100 can have a high strength. By appropriately adjusting the content of zirconium oxide in the coating film 100, the coating film 100 can have a high strength and can also have an improved durability against alkali.

As shown in FIG. 1, the coating film 100 includes the fine silicon oxide particles 5, the fine titanium oxide particles 7, and the binder 8. The coating film 100 has a protruding portion 3 including therein the fine silicon oxide particle 5. The protruding portion 3 may include one or more fine silicon oxide particles 5. The coating film 100 has the protruding portion 3 and a region 4 surrounding the protruding portion 3. The region 4 is also a region between the plurality of protruding portions 3. In the region 4, at least a portion of the fine titanium oxide particles 7 is dispersed in a matrix 9. The matrix 9 in the region 4 is formed of at least a portion of the binder 8. The protruding portion 3 protrudes upward from the region 4. The fine silicon oxide particles 5 included in the protruding portion 3 protrude from the region 4, and have surfaces that are substantially covered with a layer including at least one selected from a portion of the fine titanium oxide particles 7 and a portion of the binder 8. The fine silicon oxide particles 5, which are included in the protruding portion 3 and protrude from the region 4, may have surfaces that are substantially covered with a layer consisting substantially of a portion of the fine titanium oxide particles 7 and a portion of the binder 8. In the region 4, the principal surface of the glass sheet 10 is substantially covered with the matrix 9 in which the at least portion of the fine titanium oxide particles 7 is dispersed. The phrase "consist substantially of" means that the content of a component in a layer is 90 mass % or more, even 95 mass % or more, particularly 99 mass % or more. The phrase "substantially covered" means that 90% or more or even 95% or more of the target surface is covered.

The average value of heights H of the protruding portions 3 is not particularly limited, and is desirably at least 2 times or even at least 2.5 times a thickness T of the coating film 100 in the region 4 and at most 2 times or even at most 1.5 times the average particle diameter of the fine silicon oxide particles 5. Here, the height H of the protruding portion 3 is a height from the principal surface of the glass sheet 10 on which the coating film 100 is formed. The values H and T can be determined, specifically, by observing the cross section of the coating film 100 with an SEM and calculating the average value of measurement values at 50 random positions.

The thickness T of the coating film 100 in the region 4 is, for example, 10 nm to 5 μm, even 30 nm to 3 μm, or particularly 70 nm to 1 μm. The average value of the heights H of the protruding portions 3 falls within a range of, for example, 90% to 130% or even 100% to 120% of the average particle diameter of the fine silicon oxide particles 5.

The glass sheet 10 may be a figured glass sheet or a float glass sheet. The arithmetic average roughness Ra of the surface of the float glass sheet is preferably 1 nm or less, more preferably 0.5 nm or less. Here, the arithmetic average roughness Ra is the value specified in Japanese Industrial Standards (JIS) B 0601: 2013.

Afloat glass sheet means a glass sheet manufactured by a float process. The glass sheet manufactured by the float process has a bottom surface and a top surface. The bottom surface is one principal surface of the glass sheet, and the top surface is the other principal surface of the glass sheet opposite to the bottom surface. The bottom surface is a surface formed of glass that has been in contact with molten tin in a float bath in a glass sheet molding step by the float process. The coating film 100 may be formed on at least a portion of the top surface. In this case, the coating film 100 can contribute to an improvement in weather resistance. In particular, in the case where the coating film 100 includes $ZrO_2$, the weather resistance of the coating film 100 can be further improved.

The coating film 100 may be formed on at least a portion of the bottom surface. In this case, the coating film 100 can further sufficiently improve the visible light transmittance of the glass sheet with a coating film, compared to the case where the coating film 100 is formed on at least a portion of the top surface.

The surface of the figured glass sheet has macroscopic asperities that are large enough to be observed with the naked eye. The macroscopic asperities refer to asperities for which the mean spacing RSm is on the order of millimeters. The mean spacing RSm means the average value of lengths of peak-valley periods in the roughness profile that are determined based on points at which the roughness profile intersects the mean line. The macroscopic asperities can be observed by setting the evaluation length on the order of centimeters in the roughness profile. The mean spacing RSm of the asperities on the surface of the figured glass sheet may be 0.3 mm or more, 0.4 mm or more, or 0.45 mm or more. The mean spacing RSm may be 2.5 mm or less, 2.1 mm or less, 2.0 mm or less, or 1.5 mm or less. The asperities on the surface of the figured glass sheet preferably have, together with the mean spacing RSm in the above range, a maximum height Rz of 0.5 μm to 10 μm, particularly 1 μm to 8 μm. The mean spacing RSm and the maximum height Rz are the values specified in JIS B0601: 2013. The asperities on the surface of the glass sheet which is a figured glass sheet desirably have, together with the mean spacing RSm and the maximum height Rz in the above ranges, an arithmetic average roughness Ra of 0.3 μm to 5.0 μm, particularly 0.4 μm to 2.0 μm, even 0.5 μm to 1.2 μm. Even a figured glass sheet sometimes has an arithmetic average roughness Ra of several nm or less (e.g., 1 nm or less) in, for example, surface roughness measurement in which the evaluation length in the roughness profile is several hundred nm. That is, the surface of the figured glass sheet sometimes has microscopically excellent smoothness. The surface roughness measurement in which the evaluation length is several hundred nm is, for example, atomic force microscope (AFM) observation. In the present embodiment, an organic substance which easily stays in the recesses of the figured glass sheet is decomposed by the photocatalytic function of the fine titanium oxide particles 7 and thus is easily removed.

As described in Patent Literature 3 (paragraph 0015), it is difficult to form patterns with intervals of less than 1 mm by an imprinting process such as rolling. Thus, a technique of scattering light relying on a texture formed by the imprinting process is not suitable for preventing even minute hot spots. Compared with this, a light scattering technique by the minute protruding portions 3 including the fine silicon oxide particles 5 is suitable for preventing minute hot spots.

Even in the case where the glass sheet 10 is a figured glass sheet, the average value of the heights H of the protruding portions 3 is not particularly limited, and is desirably at least two times the thickness T of the coating film 100 in the region 4 and at most two times the average particle diameter of the fine silicon oxide particles 5.

The composition of the glass sheet 10 may be the same as those of general architectural glass sheets or the like. The content of iron oxide in the glass sheet 10 may be 0.06 mass % or less or 0.02 mass % or less in terms of $Fe_2O_3$. Iron oxide is a typical coloring component. In the case where the glass sheet 10 is a colored glass, the content of iron oxide in the glass sheet 10 may be 0.3 mass % to 1.5 mass %.

The thickness of the glass sheet 10 is not particularly limited, and is, for example, 0.5 mm to 15 mm.

The glass sheet with a coating film can have a high total light transmittance. That is, the glass sheet with a coating film has a total light transmittance of, for example, 70% or more, and can have a total light transmittance of 85% or more, 87% or more, or even 90% or more, and in some cases, 94% or more. The total light transmittance is the average value of transmittances of light incident on the glass sheet with a coating film in a measurement wavelength range, where the transmittances are measured with an integrating sphere spectrophotometer by fixing the glass sheet with a coating film closely to a light incident opening portion of an integrating sphere. In the glass sheet 10, light is made incident from the principal surface on which the coating film 100 is formed. The total light transmittance may be a value measured according to JIS K 7361-1: 1997.

The upper limit for the total light transmittance of the glass sheet with a coating film is not particularly limited, and may be 99%, 96%, or 93%.

The glass sheet with a coating film can have a high haze ratio. That is, the glass sheet with a coating film has a haze ratio of 20% or more, and can have a haze ratio of 30% or more or even 40% or more. The haze ratio is, for example, a value measured according to JIS K 7136: 2000. The upper limit for the haze ratio is not particularly limited, and may be 80%, 70%, 65%, or 63%.

The glass sheet with a coating film has a high total light transmittance and a high haze ratio. The glass sheet with a coating film achieves both a high total light transmittance and a high haze ratio. Accordingly, light incident on the glass sheet with a coating film transmits while being diffused at a high rate. Thus, when light is incident on the glass sheet with a coating film, uniform light is easily emitted over the entire glass sheet with a coating film. Furthermore, when the light source is viewed from the emission side of the glass sheet with a coating film, the shape of the light source is less noticeable. According to the greenhouse including the glass sheet with a coating film, it is possible to cause sunlight to more favorably permeate the greenhouse without local irradiation to the inside of the greenhouse with sunlight.

The glass sheet with a coating film can have a high hemispherical transmittance. That is, the glass sheet with a coating film has a hemispherical transmittance of, for example, 65% or more, and can have a hemispherical transmittance of 76% or more or even 80% or more. The upper limit for the hemispherical transmittance is not particularly limited, and may be 95%, 90%, or 86%. The hemispherical transmittance means the average value of transmittance measured for a plurality of incident angles. The measurement of the hemispherical transmittance in the present embodiment applies, for example, a method of measuring the total light transmittance by a single beam method specified in JIS K 7361-1: 1997. Specifically, first, the glass sheet with a coating film is set in a test piece holder. Light of illuminant D65 is made incident on the test piece, and light transmitted through the glass sheet with a coating film is measured. In this measurement, the incident angle of light on the test piece is varied from 0° to 90° in increments of 10°, and light transmitted through the glass sheet with a coating film at each incident angle is measured. Then, the ratio of the transmitted light intensity to the incident light intensity at each incident angle is measured. The hemispherical transmittance in the present embodiment is the average value of the ratios of the transmitted light intensity to the incident light intensity at measurement wavelengths of 400 nm to 700 nm.

The glass sheet with a coating film can have a high hemispherical transmittance. Thus, according to the glass sheet with a coating film, the inside of the greenhouse can be efficiently irradiated with sunlight even with respect to a variation in incident angle from sunrise to sunset.

The glass sheet with a coating film can have a self-cleaning performance. That is, for example, the final contact angle of water, as specified in JIS R 1703-1: 2007, on the surface of the coating film 100 is preferably 5° or less. Thus, the coating film 100 can have a property which enables easy washing-off of the dirt.

In the glass sheet with a coating film, a time period tc is 24 hours or less, for example. The time period tc is measured in a test performed according to JIS R 1703-1: 2007 by applying oleic acid to the surface of the coating film 100 and subsequently irradiating the surface of the coating film 100 with ultraviolet light at an intensity of 1.0 mW/cm$^2$, and refers to a time period from the start of irradiation with the ultraviolet light to the point at which the water contact angle on the surface of the coating film 100 reaches 5°. A shorter time period tc indicates that the glass sheet with a coating film can exhibit a higher photocatalytic function.

The time period tc of the glass sheet with a coating film may be 20 hours or less, 18 hours or less, or 15 hours or less.

(Method of Manufacturing Glass Sheet with Coating Film)

An example of a method of manufacturing a glass sheet with a coating film will be described. The glass sheet with a coating film can be manufactured by applying a coating liquid for forming the coating film 100 to a portion of one principal surface of a glass sheet and by drying and curing the film resulting from the applied coating liquid.

The coating liquid can include the source of the binder 8, the fine silicon oxide particles 5, and the fine titanium oxide particles 7. The source of the binder 8 is prepared, for example, by adding a hydrolysis catalyst and a hydrolyzable silicon compound such as a silicon alkoxide to a predetermined solvent under stirring. Hydrolysis of the hydrolyzable silicon compound is desirably performed in a solution including the fine silicon oxide particles 5. This is because a polycondensation reaction is promoted between silanol groups present on the surfaces of the fine silicon oxide particles 5 and silanol groups formed by the hydrolysis of the hydrolyzable silicon compound. This results in an increase in the proportion of the silicon oxide that contributes to binding between the fine silicon oxide particles 5 in the binder 8.

Specifically, the coating liquid is prepared, for example, by adding a hydrolysis catalyst and a hydrolyzable silicon compound such as a silicon alkoxide to a dispersion of the fine silicon oxide particles 5 under stirring. In some cases, the preparation of the coating liquid may be accomplished by hydrolysis of the hydrolyzable silicon compound followed by addition of the fine silicon oxide particles 5. The fine titanium oxide particles 7 can be added at any time during the preparation of the coating liquid. The coating liquid is prepared, for example, by adding a hydrolysis catalyst and a hydrolyzable silicon compound such as a silicon alkoxide to a mixture of the dispersion of the fine silicon oxide particles 5 and a dispersion of the fine titanium oxide particles 7 under stirring. In the case where the coating film is to include zirconium oxide, a zirconium compound is also added to the coating liquid. As the hydrolysis catalyst, either an acid or a base can be used. From the viewpoint of stability of the coating liquid, however, it is desirable to use an acid, particularly an inorganic acid, more particularly hydrochloric acid or nitric acid. As the hydrolysis catalyst, an acid having a high degree of electrolytic dissociation in an aqueous solution can be used. Specifically, an acid having an acid dissociation constant pKa of 2.5 or less can be used. In the case where the acid is a polybasic acid, pKa refers to the first acid dissociation constant. Examples of acids desired as the hydrolysis catalyst include: (i) volatile inorganic acids such as hydrochloric acid and nitric acid; (ii) organic acids such as trifluoroacetic acid, methanesulfonic acid, benzenesulfonic acid, and p-toluenesulfonic acid; (iii) polybasic acids such as maleic acid, phosphoric acid, and oxalic acid; (iv) sulfuric acid; and (v) sulfamic acid. An acidic hydrolysis catalyst allows more favorable dispersion of the fine silicon oxide particles 5 and the fine titanium oxide particles 7 than a basic hydrolysis catalyst.

The coating liquid includes a solvent. The solvent includes, as a main component, an organic solvent which is miscible with water and has a boiling point of 150° C. or less, for example. The boiling point of the organic solvent, which is included as the main component in the solvent, is, for example, 70° C. or more. The coating liquid may further include a high-boiling organic solvent which is miscible with water and with the above-described organic solvent and has a boiling point more than 150° C. The boiling point of the high-boiling organic solvent is, for example, 200° C. or less. Examples of the high-boiling organic solvent include propylene glycol, diacetone alcohol, hexylene glycol, and 3-methoxybutanol. The boiling point of propylene glycol is 187° C. The boiling point of diacetone alcohol is 168° C. The boiling point of hexylene glycol is 198° C. The boiling point of 3-methoxybutanol is 161° C. In the case where the coating liquid includes a high-boiling organic solvent, a continuous film which has no defects and is uniform can be easily obtained and the durability of the coating film 100 can be improved. In the process of drying a liquid film including the coating liquid, the high-boiling organic solvent can reduce the volatilization rate of the solvent and maintain a constant volatilization rate over the surface of the film. Thus, the dispersion stability of the fine silicon oxide particles 5 and the dispersion stability of the fine titanium oxide particles 7 in the liquid film are maintained, so that aggregation of these fine particles can be suppressed during the drying process. Furthermore, undesirable meniscus caused by local drying of the liquid film can be suppressed to improve the leveling of the liquid film. The content of the high-boiling organic solvent in the coating liquid is not particularly limited, and is, for example, 1 mass % to 20 mass %.

The method of applying the coating liquid to a principal surface of the glass sheet 10 is not particularly limited, and spin coating, roll coating, bar coating, dip coating, or spray coating can be used. From the viewpoint of mass productivity and uniformity of the appearance of the film resulting from the applied coating liquid, roll coating or bar coating may be used to apply the coating liquid to the principal surface of the glass sheet 10. From the viewpoint of mass productivity, spray coating may be used to apply the coating liquid to the principal surface of the glass sheet 10.

The coating film 100 is formed, for example, by applying the coating liquid to the glass sheet 10 and then by heating so that the glass sheet 10 has a maximum temperature of 200° C. or more and 350° C. or less and a duration during which the glass sheet 10 has a temperature of 200° C. or more is 5 minutes or less. The coating film 100 is formed, for example, by applying the coating liquid to the glass sheet 10 and then by heating so that the glass sheet 10 has a maximum temperature of 120° C. or more and 250° C. or less and a duration during which the glass sheet 10 has a temperature of 120° C. or more is 3 minutes or less. The coating film 100 is formed, for example, by applying the coating liquid to the glass sheet 10 and then by heating so that the glass sheet 10 has a maximum temperature of 100° C. or more and 250° C. or less and a duration during which the glass sheet 10 has a temperature of 100° C. or more is 2 minutes or less. The coating film 100 can be formed by heating at a relatively low temperature. Thus, it is possible to provide the coating film 100 having a high reflection suppressing function, a high photocatalytic function, or a high chemical durability. The method of drying and curing the film resulting from the applied coating liquid is not particularly limited. Thermal drying with a far-infrared heating furnace or hot-air drying can be used to dry and cure the film resulting from the applied coating liquid.

The coating film 100 may be formed, for example, by the following method. The coating liquid is applied to the glass sheet 10, and then the solvent and the like included in the coating liquid are removed by heating. Subsequently, the glass sheet 10 is placed in a heating furnace and is heated in the heating furnace set at, for example, 760° C. so that the glass sheet 10 reaches approximately 600° C. This generates a metal oxide from the metal compound included in the coating liquid, and thus the binder 8 can be formed in the coating film 100.

Embodiment 2

Figure 2:
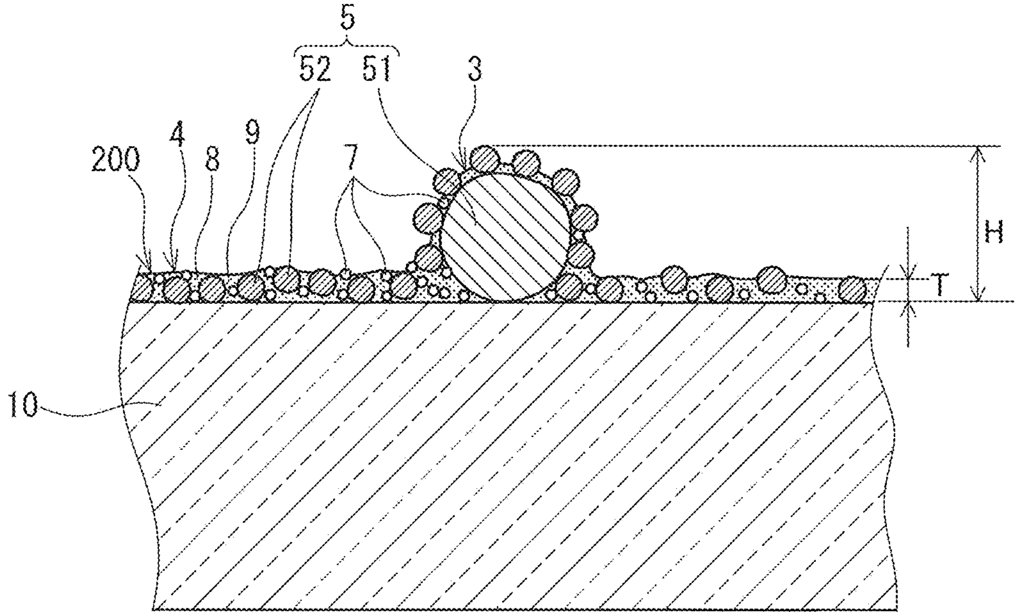
FIG. 2 is a cross-sectional view schematically showing another example of the glass sheet on which a coating according to Embodiment 2 is formed.

FIG. 2 shows another example of the glass sheet on which the coating film according to the present embodiment is formed. The elements common to the coating film 100 according to Embodiment 1 and a coating film 200 according to the present embodiment are denoted by the same reference numerals, and the description thereof may be omitted.

As shown in FIG. 2, a glass sheet with a coating film according to the present embodiment includes the glass sheet 10 and the coating film 200 formed on a principal surface of the glass sheet 10. In the coating film 200, the fine silicon oxide particles 5 include two types of fine silicon oxide particles having different average particle diameters. That is, the fine silicon oxide particles 5 included in the coating film 200 include first fine silicon oxide particles 51 and second fine silicon oxide particles 52.

The coating film 200 includes the first fine silicon oxide particles 51, the second fine silicon oxide particles 52, and the fine titanium oxide particles 7. The coating film 200 includes the binder 8 as well. The binder 8 is present at least on the surfaces of the particles and at contact portions between the particles and contact portions between the particles and the substrate, and serves to increase binding between the particles or between the particles and the substrate at the contact portions. The coating film 200 may be formed on one principal surface of the glass sheet 10. The coating film 200 may be formed on only a portion of one principal surface of the glass sheet 10.

The first fine silicon oxide particles 51 are, for example, spherical particles. At least a portion, preferably at least 50%, of the first fine silicon oxide particles 51 may be present in the state of primary particles in the height direction of the coating, in other words, may be present without being stacked with other first fine silicon oxide particles 51. The average particle diameter of the first fine silicon oxide particles 51 may be 0.1 μm to 50 μm, 0.1 μm to 20 μm, 0.3 μm to 10 μm, 0.5 μm to 10 μm, or 0.5 μm to 5 μm. By appropriately adjusting the average particle diameter of the first fine silicon oxide particles 51, incident light can be transmitted while being diffused favorably. In another preferred embodiment, the average particle diameter of the first fine silicon oxide particles 51 is preferably 0.7 μm to 5 μm, suitably 1.5 μm to 4 μm.

The second fine silicon oxide particles 52 are, for example, spherical particles. The average particle diameter of the second fine silicon oxide particles 52 may be 0.01 μm to 0.2 μm, 0.05 μm to 0.155 μm, or 0.05 μm to 0.125 μm. By appropriately adjusting the average particle diameter of the second fine silicon oxide particles 52, the coating film 200 can achieve a desired reflection suppressing function.

The ratio of the average particle diameter of the second fine silicon oxide particles 52 to the average particle diameter of the first fine silicon oxide particles 51 is not particularly limited. By appropriately adjusting the ratio of the average particle diameter of the second fine silicon oxide particles 52 to the average particle diameter of the first fine silicon oxide particles 51, incident light can be transmitted while being diffused favorably. Furthermore, the coating film 200 can achieve a desired reflection suppressing function. That is, the coating film 200 can achieve both a high total light transmittance and a high haze ratio. The ratio of the average particle diameter of the second fine silicon oxide particles 52 to the average particle diameter of the first fine silicon oxide particles 51 may be 1/100 to 1/10 or 1/50 to 1/20.

In the coating film 200, the ratio of the mass of the first fine silicon oxide particles 51 to the mass of the second fine silicon oxide particles 52 may be 6/4 to 10/1 or 7/3 to 9.5/1. Accordingly, the coating film 200 has a higher diffuse transmission function and also has a higher reflection suppressing function.

The ratio of the average particle diameter of the fine titanium oxide particles 7 to the average particle diameter of the second fine silicon oxide particles 52 may be 1/20 to 1/1.1 or 1/10 to 1/2.

As shown in FIG. 2, the coating film 200 includes the first fine silicon oxide particles 51, the second fine silicon oxide particles 52, the fine titanium oxide particles 7, and the binder 8. The coating film 200 has the protruding portion 3 including therein the first fine silicon oxide particle 51. The protruding portion 3 may include one or more first fine silicon oxide particles 51. The coating film 200 has the protruding portion 3 and the region 4 surrounding the protruding portion 3. The region 4 is also a region between the plurality of protruding portions 3. In the region 4, at least a portion of the second fine silicon oxide particles 52 and at least a portion of the fine titanium oxide particles 7 are dispersed in the matrix 9. The matrix 9 in the region 4 is formed of at least a portion of the binder 8. The protruding portion 3 protrudes upward from the region 4. The first fine silicon oxide particles 51 included in the protruding portion 3 protrude from the region 4, and have surfaces that are substantially covered with a layer including at least one selected from the group consisting of a portion of the second fine silicon oxide particles 52, a portion of the fine titanium oxide particles 7, and a portion of the binder 8. The first fine silicon oxide particles 51, which are included in the protruding portion 3 and protrude from the region 4, may have surfaces that are substantially covered with a layer consisting substantially of a portion of the second fine silicon oxide particles 52, a portion of the fine titanium oxide particles 7, and a portion of the binder 8. In the region 4, the principal surface of the glass sheet 10 is substantially covered with the matrix 9 in which the at least portion of the second fine silicon oxide particles 52 and the at least portion of the fine titanium oxide particles 7 are dispersed.

The average value of the heights H of the protruding portions 3 is not particularly limited, and is desirably at least 2 times or even at least 2.5 times the thickness T of the coating film 200 in the region 4 and at most 2 times or even at most 1.5 times the average particle diameter of the first fine silicon oxide particles 51. Here, the height H of the protruding portion 3 is a height from the principal surface of the glass sheet 10 on which the coating film 200 is formed. The values H and T can be determined, specifically, by observing the cross section of the coating film 200 with an SEM and calculating the average value of measurement values at 50 random positions.

The thickness T of the coating film 200 in the region 4 is, for example, 10 nm to 5 μm, even 30 nm to 3 μnm, or particularly 70 nm to 1 μm. The average value of the heights H of the protruding portions 3 falls within a range of, for example, 90% to 130% or even 100% to 120% of the average particle diameter of the first fine silicon oxide particles 51.

Embodiment 3

Figure 3:
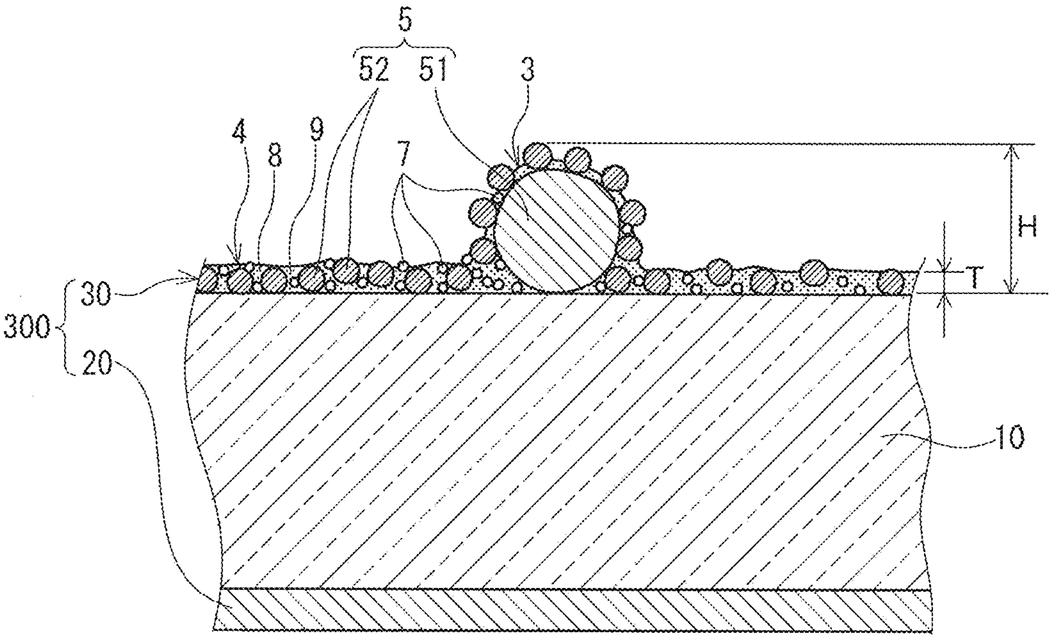
FIG. 3 is a cross-sectional view schematically showing a glass sheet with a coating film having a light diffusing film and a low-emissivity film.

As shown in FIG. 3, the glass sheet with a coating film may have, as a coating film 300, a light diffusing film 30 and a low-emissivity film 20. The light diffusing film 30 may have the characteristics of the coating film described in Embodiments 1 and 2. The low-emissivity film 20 may be formed on at least one of the principal surfaces of the glass sheet 10. In the glass sheet 10, the light diffusing film 30 and the low-emissivity film 20 may be formed on the same principal surface of the glass sheet 10. In this case, the low-emissivity film 20 and the light diffusing film 30 may be stacked in this order from the principal surface side of the glass sheet 10. In the glass sheet 10, the light diffusing film 30 may be formed on a principal surface of the glass sheet 10 opposite to a principal surface of the glass sheet 10 on which the low-emissivity film 20 is formed (FIG. 3). In this case, the low-emissivity film 20 is desirably formed on at least a portion of the top surface of a float glass sheet. Furthermore, in this case, using the low-emissivity film 20 in a greenhouse so as to face indoors is effective in reducing the heat-transfer coefficient. Examples of the low-emissivity film 20 include a stack including a transparent conductive film. By using the low-emissivity film 20, the greenhouse can have improved thermal insulation properties. The glass sheet constituting the glass sheet with a coating film may be a single glass sheet, or may be a stack, such as a multiple-glazed glass in which a plurality of glass sheets are held at intervals by a spacer and a space between the glass sheets are made airtight by a peripheral seal or a laminated glass in which a plurality of glass sheets are integrated via an intermediate film.

(Transparent Conductive Film)

A first example of the transparent conductive film is a film including a fluorine-containing tin oxide and having a thickness of 200 nm to 400 nm. This film may be a film consisting substantially of a fluorine-containing tin oxide. The transparent conductive film of the first example preferably has a thickness of 300 nm to 400 nm. In the case where the transparent conductive film of the first example is used, a base film described later preferably has a two-layer structure (e.g., a base film of a second example).

A second example of the transparent conductive film is a film including a fluorine-containing tin oxide and having a thickness of 400 nm to 800 nm. This film may be a film consisting substantially of a fluorine-containing tin oxide. The transparent conductive film of the second example preferably has a thickness of 500 nm to 700 nm. In the case where the transparent conductive film of the second example is used, the base film described later preferably has a two-layer structure (e.g., the base film of the second example).

A third example of the transparent conductive film is a transparent conductive film including: a first transparent conductive layer including antimony-containing tin oxide and having a thickness of 100 nm to 300 nm; and a second transparent conductive layer including fluorine-containing tin oxide and having a thickness of 150 nm to 400 nm. The first transparent conductive layer may be a layer consisting substantially of antimony-containing tin oxide. The second transparent conductive layer may be a layer consisting substantially of fluorine-containing tin oxide. The transparent conductive film of the third example may consist substantially of the first transparent conductive layer and the second transparent conductive layer. In the third example, the first transparent conductive layer and the second transparent conductive layer are stacked, for example, in this order from the principal surface side of the glass sheet. In the transparent conductive film of the third example, the first transparent conductive layer preferably has a thickness of 150 nm to 200 nm. In the transparent conductive film of the third example, the second transparent conductive layer preferably has a thickness of 200 nm to 300 nm. In the case where the transparent conductive film of the third example is used, the base film described later preferably has a two-layer structure (e.g., the base film of the second example).

A fourth example of the transparent conductive film is a film including dielectric layers and metal layers that are stacked alternately. The dielectric layers can be formed of an oxide, a nitride, or the like. The oxide is, for example, zinc oxide, tin oxide, and silicon oxide. The nitride is, for example, silicon nitride. The metal layer typically includes silver. This film may include additional layers referred to as sacrificial layers, base layers, etc. in addition to the dielectric layers and the metal layers.

(Base Film)

The low-emissivity film may further include a base film. The base film is disposed, for example, between the glass sheet and the transparent conductive film, and may be in direct contact with each of the glass sheet and the transparent conductive film.

A first example of the base film is a film including silicon oxycarbide (SiOC) as a main component and having a thickness of 20 nm to 120 nm. In the present description, the term "main component" means a component whose content on a mass basis is the highest. The base film of the first example may consist substantially of silicon oxycarbide. The base film of the first example preferably has a thickness of 30 nm to 100 nm, and more preferably has a thickness of 30 nm to 60 nm.

A second example of the base film is a base film including: a first base layer including tin oxide as a main component and having a thickness of 10 nm to 90 nm; and a second base layer including $SiO_2$ as a main component and having a thickness of 10 nm to 90 nm. The base film of the second example may be a base film including the first base layer consisting substantially of tin oxide and the second base layer consisting substantially of $SiO_2$. In the second example, the first base layer and the second base layer are stacked, for example, in this order from the principal surface side of the glass sheet 10. In the base film of the second example, the first base layer preferably has a thickness of 10 nm to 70 nm, and more preferably has a thickness of 12 nm to 40 nm. In the base film of the second example, the second base layer preferably has a thickness of 10 nm to 70 nm, and more preferably has a thickness of 12 nm to 40 nm.

A third example of the base film is a base film including: the first base layer including $SiO_2$ as a main component and having a thickness of 10 nm to 30 nm; the second base layer including tin oxide as a main component and having a thickness of 10 nm to 90 nm; and a third base layer including $SiO_2$ as a main component and having a thickness of 10 nm to 90 nm. The base film of the third example may be a base film consisting of: the first base layer consisting substantially of $SiO_2$; the second base layer consisting substantially of tin oxide; and the third base layer consisting substantially of $SiO_2$. In the third example, the first base layer, the second base layer, and the third base layer are stacked, for example, in this order from the principal surface side of the glass sheet 10. In the base film of the third example, the first base layer preferably has a thickness of 10 nm to 20 nm. In the base film of the third example, the second base layer preferably has a thickness of 10 nm to 70 nm, and more preferably has a thickness of 12 nm to 40 nm. In the base film of the third example, the third base layer preferably has a thickness of 10 nm to 70 nm, and more preferably has a thickness of 12 nm to 40 nm.

In the case where the low-emissivity film 20 and the light diffusing film 30 are used as the coating film, the glass sheet with a coating film has a total light transmittance slightly decreased compared to the case where a single glass sheet is used. It is sufficient to allow approximately 3% to 20% for a decrease in transmittance due to the low-emissivity film 20. In the embodiment in which the low-emissivity film 20 and the light diffusing film 30 are included as the coating film, the glass sheet with a coating film has a total light transmittance of, for example, 70% to 93%, preferably 75% to 85%, and has a hemispherical transmittance of, for example, 65% to 88%, preferably 70% to 83%. The haze ratio is hardly affected or can slightly increase by the formation of the low-emissivity film 20.

(Greenhouse)

The types of greenhouses are classified into a single-roof type, a double-roof type, or a three-quarter type according to the shape and structure of the roof. Greenhouses are further classified into single-span ones and multi-span ones. The shape of the greenhouse is not particularly limited as long as the above-described glass sheet with a coating film can be used. The glass sheet with a coating film may be used in the entire greenhouse or may be used in a portion of the greenhouse according to the type of plants to be cultivated or the type of crops to be cultivated. As long as the glass sheet with a coating film is used, the design of the greenhouse can be freely changed according to the type of plants, the type of crops, and/or the installation area of the greenhouse.

The greenhouse includes a ceiling portion. The glass sheet with a coating film may be used in the ceiling portion. The glass sheet with a coating film may be used in the entire ceiling portion of the greenhouse or may be used in a portion of the ceiling portion of the greenhouse. The ceiling portion may have an inclined roof. The orientation of the inclined roof is not particularly limited. The inclined roof may be inclined at an inclination angle $\alpha$ with respect to the horizontal plane. The inclination angle $\alpha$ may be 15° or more or 20° or more with respect to the horizontal plane. The upper limit for the inclination angle $\alpha$ is not particularly limited, and may be 70°, 67°, 50°, 45°, or 35° with respect to the horizontal plane. In the ceiling portion of the greenhouse, owing to the roof inclined at the inclination angle $\alpha$ with respect to the horizontal plane, the dirt accumulated on the roof is easily washed away by rainwater and the like.

By using the glass sheet with a coating film in a portion of the ceiling portion of the greenhouse, it is possible to cause sunlight to more favorably permeate the greenhouse without local irradiation to the inside of the greenhouse with sunlight. Furthermore, even when dirt such as sand dust adheres to the surface of the glass sheet with a coating film, the photocatalytic function enables decomposition of an organic substance adhering to the surface of the glass sheet with a coating film to weaken the adhesion force of the organic substance, so that the organic substance can be washed off by rainwater and the like.

The ceiling portion of the greenhouse may be provided with a skylight. In this case, the glass sheet with a coating film may constitute a portion of the skylight.

EXAMPLES

Hereinafter, the present invention will be described in more detail with reference to examples. First, a method of evaluating each of characteristics of a glass sheet with a coating film according to each of the examples and comparative examples will be described.

(Total Light Transmittance)

The total light transmittance was measured for the glass sheets with coating films according to the examples and the comparative examples, according to Japanese Industrial Standards (JIS) K 7361-1: 1997. The measurement of the total light transmittance was performed with a haze meter (NDH2000 manufactured by NIPPON DENSHOKU INDUSTRIES CO., LTD.). The transmittance to visible light incident on the glass sheets with coating films according to the examples and the comparative examples was measured in a state in which the glass sheets with coating films according to the examples and the comparative examples was fixed in close contact with the light incident opening portion of the integrating sphere. The results are shown in Tables 1 and 2.

(Haze Ratio)

The haze ratio was determined for the glass sheets with coating films according to the examples and the comparative examples according to JIS K 7136: 2000. The measurement of the haze ratio was performed with a haze meter (NDH2000 manufactured by NIPPON DENSHOKU INDUSTRIES CO., LTD.). The haze ratio with respect to incident visible light was measured for the glass sheets with coating films according to the examples and the comparative examples. The results are shown in Tables 1 and 2.

(Hemispherical Transmittance)

The hemispherical transmittance was measured with a single beam spectrophotometer (LAMBDA1050 manufactured by PerkinElmer, Inc.) equipped with an automated reflectance/transmittance analyzer (ARTA). Specifically, the total light transmittance with respect to incident light having a wavelength of 400 nm to 700 nm was measured according to JIS K7361-1: 1997. Note, however, that the incident angle of light on the glass sheet with a coating film was varied from 0° to 90° in increments of 10°. The total light transmittance at each incident angle was measured, and the average value thereof was determined as the hemispherical transmittance. Also, the sample size was cut out so as to have a 50 mm-square shape. Furthermore, the spot diameter of the light source in the sample was 10 mm. The results are shown in Tables 1 and 2.

(Measurement of Water Contact Angle)

The water contact angle was measured for the coating films according to the examples and the comparative examples according to JIS R 1703-1: 2007. First, oleic acid was diluted with n-heptane to prepare an oleic acid solution adjusted to 0.5 vol %. The oleic acid solution was applied to the glass sheet with a coating film with a dip coater. Specifically, the glass sheet with a coating film was immersed in the oleic acid solution for 10 seconds and then pulled up at a speed of 60 cm/min. Next, the glass sheet with a coating film was dried at 70° C. for 15 minutes to obtain a test piece.

When a test in which the test piece prepared as described above was irradiated with ultraviolet light (black light blue fluorescent ultraviolet lamp, wavelength: 368 nm, intensity: 1.0 mW/cm$^2$) by using an ultraviolet irradiation device was performed, the time period tc from the start of irradiation with the ultraviolet light until the water contact angle on the surface of the coating film reached 5° was measured. The measurement of the water contact angle on the surface of the coating film was performed with a contact angle meter (manufactured by Kyowa Interface Science Co., Ltd.). The results are shown in Tables 1 and 2.

Example 1

In a glass container, 61.1 g of commercially available propylene glycol monomethyl ether, 12.5 g of tetraethoxysilane, 6.5 g of purified water, 15.3 g of a first fine silicon oxide particle dispersion (solids concentration of 48.4%, average particle diameter of 3.5 μm), 3.7 g of a second fine silicon oxide particle dispersion (solids concentration of 22.9%, average particle diameter of 0.1 μm), and 1.0 g of 1N nitric acid (hydrolysis catalyst) were weighed. This glass container was stirred for 8 hours in an oven maintained at 40° C. to obtain a high-concentration solution. This high-concentration solution had a solids concentration of 12%, and the mass ratio of the first fine silicon oxide particles, the second fine silicon oxide particles, and the binder in terms of $SiO_2$ in the high-concentration solution was 6.3:0.7:3.

An amount of 83.3 g of the above-described high-concentration solution, 8.0 g of propylene glycol monomethyl ether, 1.2 g of a zirconium compound (concentration of 25 wt % as $ZrO_2$), 1.7 g of a fine titanium oxide particle dispersion (concentration of 30 wt % as $TiO_2$, primary particle diameter (average particle diameter) of 10 nm, dispersion medium: water), and 5.0 g of a surfactant (KP-341 manufactured by Shin-Etsu Silicones, liquid obtained by diluting with propylene glycol monomethyl ether to 1 wt %) were stirred and mixed to obtain a coating solution. The coating solution had a solids concentration of 10.8%. The concentration of the solids with respect to the entire coating liquid according to Example 1 was 10.8 mass %. The solids of the coating liquid according to Example 1 included 58.3 mass % the first fine silicon oxide particles, 6.5 mass % the second fine silicon oxide particles, 4.6 mass % the fine titanium oxide particles, 27.8 mass % tetraethoxysilane in terms of $SiO_2$, and 2.8 mass % the zirconium compound in terms of $ZrO_2$. The mass of the solids in the coating liquid is defined as the sum of the mass of tetraethoxysilane (source of silicon oxide for the binder) in terms of $SiO_2$, the mass of the solids in the first fine silicon oxide particle dispersion, the mass of the solids in the second fine silicon oxide particle dispersion, the mass of the solids in the fine titanium oxide particle dispersion, and the mass of the zirconium compound, which is optionally added, in terms of $ZrO_2$.

Figure 4:
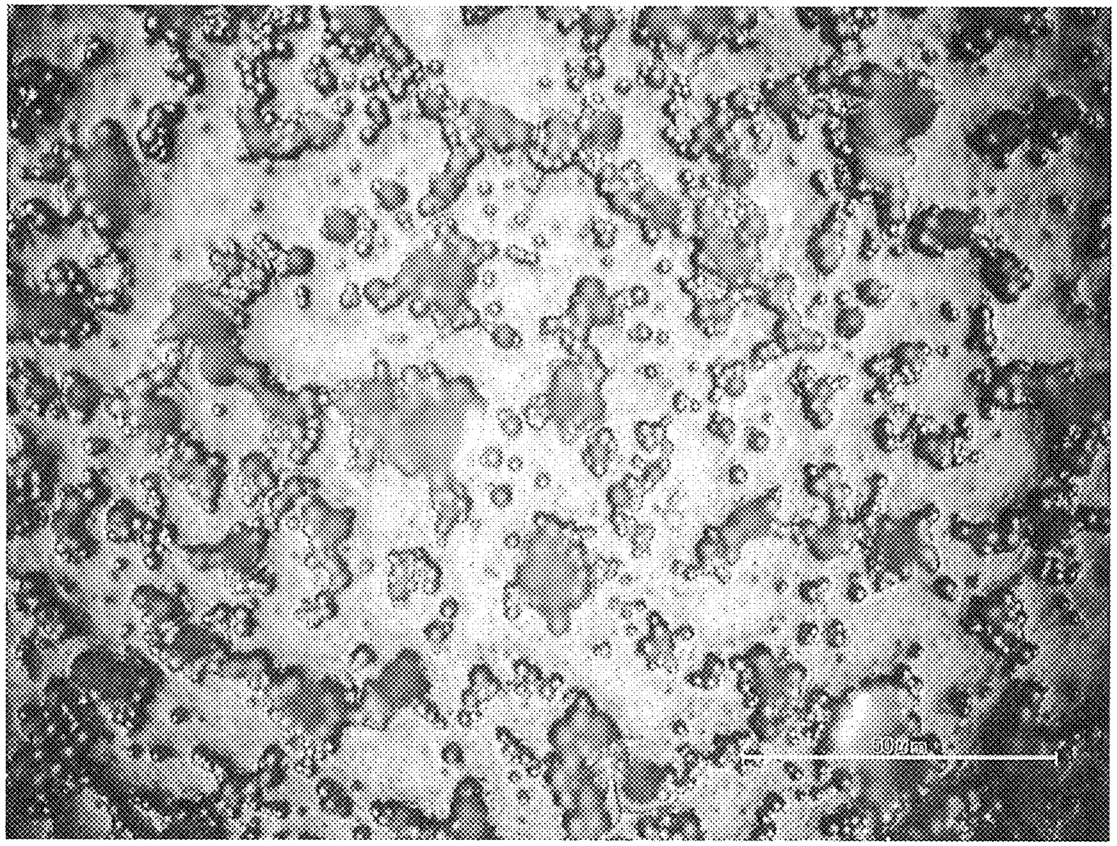
FIG. 4 is a view showing the results of observation with an optical microscope on a surface of a coating film formed in Example 1.
Figure 5:
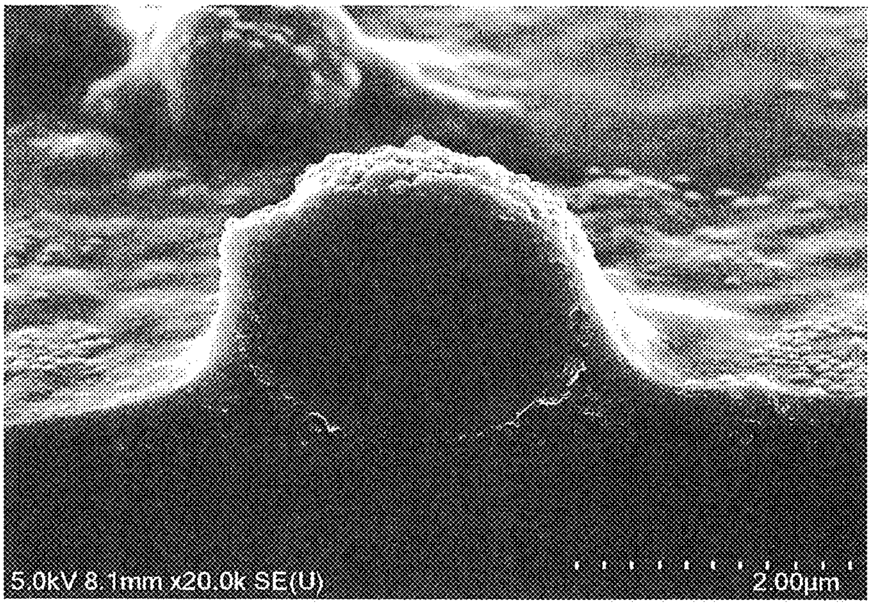
FIG. 5 is a view showing the results of observation with a scanning electron microscope (SEM) on a cross section of the coating film formed in Example 1.

The coating liquid was applied by spray coating to the surface of the glass sheet washed (100×100 mm; thickness of 3 mm; float glass sheet). The coating liquid continued to be stirred until just before application. The glass sheet to which the coating liquid had been applied was dried in an oven set at 200° C. and then baked in an electric furnace set at 610° C. for 3.5 minutes. Thus, a glass sheet with a coating film according to Example 1 was obtained. The above characteristics were each evaluated for the glass sheet with a coating film according to Example 1. The evaluation results are shown in Table 1. The results of observation with an optical microscope on a surface of the formed coating film are shown in FIG. 4. The results of observation with a scanning electron microscope (SEM) on a cross-section of the formed coating film are shown in FIG. 5.

Examples 2 to 6

Glass sheets with coating films according to Examples 2 to 6 were obtained in the same manner as in Example 1.

Examples 7 and 8

Glass sheets with coating films according to Examples 7 and 8 were obtained in the same manner as in Example 1 except that the first fine silicon oxide particles used were those having an average particle diameter of 0.9 μm.

Example 9

First, as a float glass sheet with a low-emissivity film, a glass sheet with a transparent conductive film (Low-E glass manufactured by Nippon Sheet Glass Co., Ltd.) was cut out so as to have principal surfaces with a 10-cm square shape, and then the cutout was washed. In this glass sheet with a transparent conductive film, on one principal surface of a float glass sheet having a thickness of 3 mm, a $Sn)_2$ layer having a physical film thickness of 25 nm (first base layer), a $SiO_2$ layer having a physical film thickness of 25 nm (second base layer), and a $SnO_2$: F layer having a physical film thickness of 340 nm (transparent conductive layer) were stacked in this order.

A glass sheet with a coating film according to Example 9 was obtained in the same manner as in Example 1 except that the glass sheet with a transparent conductive film was used. Note, however, that the coating liquid was applied to a principal surface of the glass sheet opposite to the principal surface of the glass sheet on which the low-emissivity film was formed.

Example 10

In a glass container, 22.5 g of propylene glycol monomethyl ether, 1.1 g of tetraethoxysilane, 12.7 g of the second fine silicon oxide particle dispersion (solids concentration of 22.9%, primary particle diameter (average particle diameter) of 75 nm, dispersion medium: water), 2.2 g of the fine titanium oxide particle dispersion, and 0.4 g of 1N hydrochloric acid (hydrolysis catalyst) were weighed. This glass container was stirred for 8 hours in an oven maintained at 40° C. to obtain a high-concentration solution. This high-concentration solution had a solids concentration of 10%, and the mass ratio of the second fine silicon oxide particles, the fine titanium oxide particles, and the binder in terms of $SiO_2$ in the high-concentration solution was 75: 17: 8. Next, 260.9 g of propylene glycol monomethyl ether, 0.06 g of a silicone-based surfactant (CS3505 manufactured by Momentive Performance Materials Inc.), and 39.0 g of the above-described high-concentration solution were stirred and mixed to obtain a coating solution. The coating solution had a solids concentration of 1.3%.

A coating liquid was applied by spray coating to an asperity surface of a glass sheet washed (manufactured by Nippon Sheet Glass Co., Ltd.; 300 mm×100 mm; thickness of 3 mm; figured glass sheet). The figured glass sheet used has a soda-lime silicate composition, and its asperity surface is represented by an arithmetic average roughness Ra of 0.8 μm, a maximum height Rz of 4.5 μm, and a mean spacing RSm of 1.1 mm. The coating liquid continued to be stirred until just before application. The glass sheet to which the coating liquid had been applied was dried in an oven set at 400° C. and then baked in an electric furnace set at 760° C. for 5 minutes. Thus, a glass sheet with a coating film according to Example 10 was obtained.

Comparative Example 1

A glass sheet with a coating film according to Comparative Example 1 was obtained in the same manner as in Example 1, except that the coating film included no fine titanium oxide particles and that the coating liquid was prepared so as to have the solids concentration as described in Table 2.

Comparative Example 2

A glass sheet with a coating film according to Comparative Example 2 was obtained in the same manner as in Example 10, except that the coating film included no fine titanium oxide particles and that the coating liquid was prepared so as to have the solids concentration as described in Table 2.

TABLE 1

| | | Example | | | | | | | |
|---|---|---|---|---|---|---|---|---|---|
| | | 1 | 2 | 3 | 4 | 5 | 6 | 7 | 8 |
| First fine silicon oxide particles [mass %] | | 58.3 | 55.8 | 40.9 | 24.1 | 59.9 | 60.5 | 53.3 | 46.0 |
| Second fine silicon oxide particles [mass %] | | 6.5 | 6.2 | 4.5 | 2.7 | 22.7 | 23.5 | 22.9 | 24.8 |
| First + second fine silicon oxide particles [mass %] | | 64.8 | 62.0 | 45.4 | 26.8 | 82.6 | 84.0 | 76.2 | 70.8 |
| Fine titanium oxide particles [mass %] | | 4.6 | 8.8 | 4.5 | 4.5 | 2.0 | 1.0 | 1.0 | 0.9 |
| Binder [mass %] | | 30.6 | 29.2 | 50.0 | 68.8 | 15.4 | 13.0 | 22.8 | 28.3 |
| Silicon oxide included in binder [mass %] | | 27.8 | 26.5 | 45.5 | 62.5 | 12.8 | 12.5 | 19.0 | 23.6 |
| $ZrO_2$ included in binder [mass %] | | 2.8 | 2.7 | 4.5 | 6.3 | 2.6 | 2.5 | 3.8 | 4.7 |
| Glass sheet type | | Float glass sheet | | | | | | | |
| Characteristics | Haze ratio [%] | 62.5 | 62.9 | 55.2 | 47.3 | 41.6 | 49.6 | 49.6 | 74.2 |
| | Total light transmittance [%] | 95.6 | 94.5 | 93.5 | 92.8 | 94.4 | 95.8 | 95.9 | 96.8 |
| | Hemispherical transmittance [%] | 85.6 | 84.5 | 83.5 | 82.8 | 84.4 | 85.8 | 85.9 | 86.8 |
| | tc [hour] | 10 hours or less | 6 hours or less | 12 hours or less | 15 hours or less | 15 hours or less | 15 hours or less | 15 hours or less | 15 hours or less |

TABLE 2

| | | Example | | Comparative Example | |
|---|---|---|---|---|---|
| | | 9 | 10 | 1 | 2 |
| First fine silicon oxide particles [mass %] | | 58.3 | — | 61.2 | — |
| Second fine silicon oxide particles [mass %] | | 6.5 | 75.0 | 6.8 | 70.0 |
| First + second fine silicon oxide particles [mass %] | | 64.8 | 75.0 | 67.0 | 70.0 |
| Fine titanium oxide particles [mass %] | | 4.6 | 17.0 | — | — |
| Binder [mass %] | | 30.6 | 8.0 | 30.0 | 30.0 |
| Silicon oxide included in binder [mass %] | | 27.8 | 8.0 | 29.1 | 30.0 |
| $ZrO_2$ included in binder [mass %] | | 2.8 | — | 2.9 | — |
| Glass sheet type | | Float glass sheet with low-emissivity film | Figured glass sheet | Float glass sheet | Figured glass sheet |
| Characteristics | Haze ratio [%] | 62.5 | 53.7 | 60.3 | 52.1 |
| | Total light transmittance [%] | 82.5 | 93.7 | 95.1 | 94.1 |
| | Hemispherical transmittance [%] | 80.2 | 83.7 | 75.1 | 74.1 |
| | tc [hour] | 10 hours or less | 10 hours or less | 48 hours or more | 48 hours or more |

The glass sheets with coating films according to Examples 1 to 10 had a haze ratio of 41.6% or more, and had a high diffuse transmittance. The glass sheets with coating films according to Examples 1 to 10 had a total light transmittance of 82.5% or more, and transmitted light at a high rate. The glass sheets with coating films according to Examples 1 to 10 had a hemispherical transmittance of 80.2% or more, and had a high transmittance even at a large incident angle. The glass sheets with coating films according to Examples 1 to 10 had a time period tc of 15 hours or less, and had a high photocatalytic function. The glass sheets with coating films according to Comparative Examples 1 and 2, which included two types of fine silicon oxide particles, had a high haze ratio and a high total light transmittance. The glass sheets with coating films according to Comparative Examples 1 and 2 had a time period tc of 48 hours or more. The coating films according to Comparative Examples 1 and 2, which included no fine titanium oxide particles, had a decreased photocatalytic function.

FIG. 4 is a view showing the results of observation with the optical microscope on the surface of the coating film 100 formed in Example 1. As shown in FIG. 4, the coating film 200 was formed on the glass sheet 10. FIG. 5 is a view showing the results of observation with the SEM on the cross section of the coating film 200 formed in Example 1. As shown in FIG. 5, the coating film 200 was formed on the surface of the glass sheet 10.

INDUSTRIAL APPLICABILITY

The present invention provides: a glass sheet that is suitable for use in greenhouses, has a high diffuse transmission function, and on which a coating exhibiting excellent removal performance for dirt such as sand dust is formed; and a greenhouse including the glass sheet on which the coating is formed. This glass sheet is suitable for use as a glass article that is expected to be used outdoors for a long time period.

The invention claimed is:

1. A greenhouse comprising:

a ceiling portion; and in at least a portion of the ceiling portion, a glass sheet with a coating film, wherein the glass sheet with the coating film includes a float glass sheet and the coating film, the coating film being formed on a principal surface of the float glass sheet, the coating film includes fine silicon oxide particles, fine titanium oxide particles, and a binder, the fine silicon oxide particles include first fine silicon oxide particles and second fine silicon oxide particles, the coating film has protruding portions and a region surrounding the protruding portions, an average value of heights H of the protruding portions from the principal surface of the float glass sheet is at least two times a thickness T of the coating film in the region, the protruding portions each include only one particle of the first fine silicon oxide particles, the first fine silicon oxide particles included in the protruding portions have surfaces that are substantially covered with a layer including at least one selected from a group consisting of a first portion of the second fine silicon oxide particles, a first portion of the fine titanium oxide particles, and a first portion of the binder, the first fine silicon oxide particles have an average particle diameter of 1.5 μm to 50 μm, in the region surrounding the protruding portions, at least a second portion of the second fine silicon oxide particles and at least a second portion of the fine titanium oxide particles are dispersed in a matrix including at least a second portion of the binder, the coating film includes, in mass %: 0.9% to 8.8% $TiO_2$ included in the fine titanium oxide particles, the glass sheet with the coating film has a total light transmittance of 92.8% to 98%, a haze ratio of 41.6% to 80%, and a hemispherical transmittance of 80% to 90%, and when a test is performed according to Japanese Industrial Standards (JIS) R 1703-1: 2007 by applying oleic acid to a surface of the coating film and subsequently irradiating the surface with ultraviolet light at an intensity of 1.0 $mW/cm^2$, a time period from start of irradiation with the ultraviolet light to a point at which a water contact angle on the surface reaches 5° is 15 hours or less.

2. The greenhouse according to claim 1, wherein the fine silicon oxide particles have an average particle diameter of 0.05 μm to 50 μm, the fine titanium oxide particles have an average particle diameter of 0.01 μm to 0.03 μm, and a ratio of the average particle diameter of the fine titanium oxide particles to the average particle diameter of the fine silicon oxide particles is 0.001 to 0.3.

3. The greenhouse according to claim 2, wherein the coating film includes, in mass %:

22% to 85% the fine silicon oxide particles;

0.9% to 8.8% the fine titanium oxide particles; and

5% to 77.5% the binder.

4. The greenhouse according to claim 3, wherein the binder includes $SiO_2$ and $ZrO_2$.

5. The greenhouse according to claim 3, wherein the coating film includes, in mass %:

79% to 98% a sum of $SiO_2$ included in the fine silicon oxide particles and $SiO_2$ included in the binder;

0.9% to 8.8% $TiO_2$ included in the fine titanium oxide particles; and

0% to 10% $ZrO_2$.

6. The greenhouse according to claim 5, wherein the coating film includes, in mass %:

79% to 98% the sum of $SiO_2$ included in the fine silicon oxide particles and $SiO_2$ included in the binder;

0.9% to 8.8% $TiO_2$ included in the fine titanium oxide particles; and

1% to 7% $ZrO_2$.

7. The greenhouse according to claim 6, wherein the coating film includes, in mass %:

85% to 95% the sum of $SiO_2$ included in the fine silicon oxide particles and $SiO_2$ included in the binder;

0.9% to 8.8% $TiO_2$ included in the fine titanium oxide particles; and

1% to 7% $ZrO_2$.

8. The greenhouse according to claim 2, wherein the second fine silicon oxide particles have an average particle diameter of 0.05 μm to 0.125 μm.

9. The greenhouse according to claim 8, wherein the first fine silicon oxide particles have the average particle diameter of 1.5 μm to 10 μm.

10. The greenhouse according to claim 9, wherein a ratio of a mass of the first fine silicon oxide particles to a mass of the second fine silicon oxide particles is 6/4 to 10/1.

11. The greenhouse according to claim 10, wherein the ratio of the mass of the first fine silicon oxide particles to the mass of the second fine silicon oxide particles is 7/3 to 9.5/1.

12. The greenhouse according to claim 9, wherein in the region surrounding the protruding portions, the principal surface of the float glass sheet is substantially covered with the matrix.

13. The greenhouse according to claim 9, wherein the average value of heights H of the protruding portions from the principal surface of the float glass sheet is at most two times the average particle diameter of the first fine silicon oxide particles.

14. The greenhouse according to claim 1, wherein the ceiling portion is inclined at an inclination angle α with respect to a horizontal plane, where $15° < \alpha < 67°$ is satisfied.

15. A greenhouse comprising:

a ceiling portion; and in at least a portion of the ceiling portion, a glass sheet with a coating film, wherein the glass sheet with the coating film includes a float glass sheet and the coating film, the float glass sheet having a first principal surface and a second principal surface, the glass sheet with the coating film includes, as the coating film, a light diffusing film and a low-emissivity film, the light diffusing film being formed on the first principal surface of the float glass sheet, the light diffusing film includes fine silicon oxide particles and fine titanium oxide particles, the fine silicon oxide particles include first fine silicon oxide particles and second fine silicon oxide particles, the light diffusing film has protruding portions and a region surrounding the protruding portions, an average value of heights H of the protruding portions from the first principal surface of the float glass sheet is at least two times a thickness T of the light diffusing film in the region, the protruding portions each include only one particle of the first fine silicon oxide particles, the first fine silicon oxide particles included in the protruding portions have surfaces that are substantially covered with a layer including at least one selected from a group consisting of a first portion of the second fine silicon oxide particles, a first portion of the fine titanium oxide particles, and a first portion of the binder, the first fine silicon oxide particles have an average particle diameter of 1.5 μm to 50 μm, in the region surrounding the protruding portions, at least a second portion of the second fine silicon oxide particles and at least a second portion of the fine titanium oxide particles are dispersed in a matrix including at least a second portion of the binder, the coating film includes, in mass %: 0.9% to 8.8% $TiO_2$ included in the fine titanium oxide particles, the glass sheet with the coating film has a total light transmittance of 70% to 93%, a haze ratio of 41.6% to 80%, and a hemispherical transmittance of 65% to 88%, and when a test is performed according to Japanese Industrial Standards (JIS) R 1703-1: 2007 by applying oleic acid to a surface of the light diffusing film and subsequently irradiating the surface with ultraviolet light at an intensity of 1.0 $mW/cm^2$, a time period from start of irradiation with the ultraviolet light to a point at which a water contact angle on the surface reaches 5° is 15 hours or less.

16. The greenhouse according to claim 15, wherein the glass sheet with the coating film includes the low-emissivity film on the second principal surface of the float glass sheet.

17. A glass sheet with a coating film comprising:

a float glass sheet; and the coating film, the float glass sheet having a first principal surface and a second principal surface, the coating film being formed on a first principal surface of the float glass sheet, wherein the coating film includes fine silicon oxide particles, fine titanium oxide particles, and a binder, the fine silicon oxide particles include first fine silicon oxide particles and second fine silicon oxide particles, the coating film has protruding portions and a region surrounding the protruding portions, an average value of heights H of the protruding portions from the first principal surface of the float glass sheet is at least two times a thickness T of the coating film in the region, the protruding portions each include only one particle of the first fine silicon oxide particles, the first fine silicon oxide particles included in the protruding portions have surfaces that are substantially covered with a layer including at least one selected from a group consisting of a first portion of the second fine silicon oxide particles, a first portion of the fine titanium oxide particles, and a first portion of the binder, the first fine silicon oxide particles have an average particle diameter of 1.5 μm to 50 μm, in the region surrounding the protruding portions, at least a second portion of the second fine silicon oxide particles and at least a second portion of the fine titanium oxide particles are dispersed in a matrix including at least a second portion of the binder, the coating film includes, in mass %: 0.9% to 8.8% $TiO_2$ included in the fine titanium oxide particles, the glass sheet with the coating film has a total light transmittance of 92.8% to 98%, a haze ratio of 41.6% to 80%, and a hemispherical transmittance of 80% to 90%, and when a test is performed according to Japanese Industrial Standards (JIS) R 1703-1: 2007 by applying oleic acid to a surface of the coating film and subsequently irradiating the surface with ultraviolet light at an intensity of 1.0 $mW/cm^2$, a time period from start of irradiation with the ultraviolet light to a point at which a water contact angle on the surface reaches 5° is 15 hours or less.

18. The glass sheet with the coating film according to claim 17, wherein the ratio of a mass of the first fine silicon oxide particles to a mass of the second fine silicon oxide particles is 7/3 to 9.5/1.

19. The glass sheet with the coating film according to claim 17, wherein the glass sheet with the coating film further includes a low-emissivity film on the second principal surface of the float glass sheet.

* * * * *